(12) United States Patent
Little

(10) Patent No.: X9881
(45) Date of Patent: Jul. 2, 1836

(54) WASHING MACHINE

(76) Inventor: James H. Little

James H. Littel
Letters Patent (Patented July 2, 1836)

The Schedule referred to in these Letters Patent and making part of the same containing a description in the words of the said James H Littel himself of his improvements in the Washing machine.

Description of the Washing Machine – First a strong box is to be made of well seasoned pine stuff about one inch in thickness. The Box should be about 20 inches in width in the inside, and four feet long, at – At the extremity of the box, at which the crank is placed, it should be about 6. inches in depth so as to give space for the motion of a crank of about 5 inches. The sides of the machine at the other extremity. – should be about two feet wide for the space of 16 inches from the end, so as to cover and enclose the upright pitman and the rod upon which they are suspended. The bottom of the box at this extremity. should be made so as to form a curve or [illegible] arc of a circle for the space of about 20 inches to correspond with the one performed by the beaters. or pounders of the machine when in operation. Two thirds of the distance from the circular extremity of the machine the box should be closely covered to prevent the escape of the suds. when the machine is in operation. The end of the machine should have a curve of less circumference than the bottom to give the clothing the proper space and to give them a turning and upward motion during the operation of the machine, at the pleasure of the maker. At a proper distance from the shallow end of the box metallic Boxes should be placed on, and secured to its sides by screws or otherwise, for the bearing of the crank which is to give motion to the machine. On these boxes is placed a triple crank of metal or wood (the for one of which is preferred) divided into equal triple divisions
of a circle. for the attachment of the extremities of three inclined
pitmans. At one extremity it should have an arm about
14 inches in length with a suitable handle for the appli-
cation of manual power. but it is intended for the ap-
plication of all kinds of power and should be varied in
its construction, accordingly. To each of the bearings of this
crank is attached the end of an inclined Pitman about 2
feet and eight inches length connected at their other extrem-
ities to the beaters or pounders by mortise and pin or such
other hinge connection as the builder shall prefer. A
cast or wrought iron crank of about one inch in diam-
eter, would be a suitable size for a machine of the above
dimensions, to be used by manual power and can be varied
according to the size of the machine, and the degree and
kind of power to be applied thereto. Three pounders or beat-
ers are connected as follows. viz Depth about 12 inches
thickness 6½ inches, length at top about 8 inches. at
the bottom about 10 inches and to correspond in curvature
with the bottom of the machine beneath them. The faces
of the pounders to have a concave surface of about the same
arch (but reversed) as the end of the machine opposite
to them and between which the articles to be cleansed
are to be placed. The faces of the beaters to be fluted horizon-
tally to the depth of one or two inches, and may be also fluted
perpendicularly to about the same depth; in which case
the extremities of the projections should have a surface of about
one inch square. These faces may be of iron, or other metal
if desired by the builder. The beaters are suspended from
a rod across the top of the machine, by upright pitmans
of a length required by the arc of the circle of the bottom of
the machine beneath them. There can be more or less than three beaters connected with the crank by its being divided into a
greater or less number of equal divisions of one inch but the
number three is recommended as convenient and suitable for the
purposes of the machine. The machine should be placed on a
suitable frame, at the height of about 14 inches from the floor
to allow a convenient space for placing a tub or pail beneath it
to receive the suds and to be convenient for the operation of work-
ing and using the machine. The machine may also be put in
operation by eccentric circles upon the shaft instead of cranks
if a preference should be given to that mode of operation, but
which would be more expensive in its construction.

I claim the application of the triple crank, the inclined
pitmans, and the triple beaters as applied to washing machines
and the principles of the application thereof whether of a
greater or less number, and whether the power and motion is
communicated by cranks or eccentric circles. The advanta-
ges of this machine are believed to consist in a more equal
division of power by the triple crank, and in the con-
stant and rapid succession of the beats upon the clothes
in the reacting power of the water in forcing back the beaters
in succession to each other, and in the simple and conveni-
ent manner of its application to the purposes intended.

The manner of its use for the purposes of washing clothes
does not differ from other machines so much as to require
any definite instructions James H. Gillett Witnesses
Chs. L. Elliott
Benjamin Nye (Patented 2 July 1830)

(102 words)

(Recd & Recorded anew June 29. 1839.)